3,346,608
PHOSPHITE - CONTAINING NICKEL - (O)-COMPLEXES AND METHOD FOR THEIR PREPARATION
Nikolaus von Kutepow, Karlsruhe, and Hubertus Seibt and Fritz Meier, Ludwigshafen (Rhine), Germany, assignors to Badische Anilin- & Soda-Fabrik Aktiengesellschaft, Ludwigshafen (Rhine), Germany
No Drawing. Filed May 19, 1965, Ser. No. 457,183
Claims priority, application Germany, July 7, 1960, B 58,507
11 Claims. (Cl. 260—439)

The present application is a continuation-in-part application of our copending application Ser. No. 121,362, filed July 3, 1961, now Patent No. 3,219,714, the disclosure of which is incorporated herein by reference as fully as if set forth in its entirety.

This invention relates to new nickel-(O) complex compounds which contain phosphites as ligands, and the invention further relates to a method of preparing the new compounds.

Complex compounds have been suggested in the art as having the general formula:

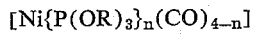
$$[Ni\{P(OR)_3\}_n(CO)_{4-n}]$$

wherein R represents aliphatic or aromatic radicals and $n$ is an integer of from 1 to 4. Compounds of this type where $n$ is 1 or 2 have been produced and are known as being catalytically active for the production of cyclic diolefines and triolefines from open chain conjugated dienes. However, these known complexes have only a limited catalytic activity and are otherwise objectionable due to their content of carbon monoxide. Compounds of the formula

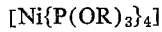
$$[Ni\{P(OR)_3\}_4]$$

are hypothetical only, there being no evidence that such compounds actually exist.

Accordingly, one object of the present invention is to provide complex nickel-(O) compounds which contain an organic phosphite ester and which are free from carbon monoxide. Another object of the invention is to provide these complex nickel-(O) compounds as new catalysts for the process of oligomerizing 1,3-dienes, the new catalysts exhibiting high catalytic activity in this process. Still another object is to provide a process for the production of the novel catalysts which avoids working with carbonyl-containing compounds.

It has now been found in accordance with the invention that the foregoing objects are achieved by providing compounds having the structural formula:

$$[Ni\{P(OR_3\}_xZ_{y-1}]$$

wherein R represents a member selected from the group consisting of alkyl, aryl, alkylaryl and halogenaryl, Z represents a member of the group consisting of $\alpha$, $\beta$-ethylenically unsaturated aldehydes and nitriles, $x$ stands for an integer of from 2 to 3, and $y$ stands for an integer of from 1 to 2, the sum of $x$ and $y-1$ being an integer of from 2 to 3.

Typical compounds of the invention falling within this formula are tris(triphenylphosphite) nickel,
bis-(tri-o-cresylphosphite) acrylonitrile nickel,
tris-(tri-m-tolylphosphite)-nickel,
bis-(3,5-dimethylphenyl-phosphite)-mono-acrylonitrile nickel,
bis-(tri-thymylphosphite)-nickel,
bis-(tri-o-diphenylphosphite)-nickel,
bis-(tri-2,4-ditertiary-butylphenyl-phosphite)-nickel,
bis-(tri-4-tertiary-butylphenyl-phosphite)-nickel,
tris-(tri-o-chlorphenyl-phosphite)-nickel, and
bis-(tri-4-iso-octyl-phenyl-phosphite)-nickel.

The compounds of the invention are produced by reaction of a complex nickel-(O) compound containing only $\alpha$, $\beta$-olefinically unsaturated aldehydes or $\alpha$, $\beta$-unsaturated nitriles as ligands with a triester of phosphorous acid. Nickel-(O) complexes containing the lower aliphatic $\alpha$, $\beta$-olefinically unsaturated aldehydes, i.e., with 3 to 6 carbon atoms, such as acrolein, or $\gamma$-bromocrotonaldehyde, or containing lower olefinically unsaturated aliphatic nitriles such as acrylonitrile or fumaro nitrile and also cinnamyl nitrile, are the preferred initial materials.

Examples of complexes of this kind are: nickel (O)-bis-acrolein, nickel (O)-bis-acrylonitrile, nickel (O)-bis-cinnamonitrile, and nickel (O)-bis-fumaronitrile.

The common feature of these reactant organo-nickel complexes is that the organic ligands are believed to be combined by means of the $\pi$-electrons contained in the olefinic double linkages. In general, the readily accessible nickel bis-acrylonitrile is preferred. The term "ligand" is employed herein as a definition of the coordinated organic compound which is complexed with nickel, and for a better understanding of the manner in which the nickel is bound or linked to the organic ligand, reference is made to the general survey of the coordination compounds in "The Chemistry of Coordination Compounds," edited by I. C. Bailar, New York, 1956.

Thus, in the method of producing the new catalysts in accordance with the present invention, the reactant organo-nickel compound consists of nickel-(O) in complex combination with an organic ligand which is the unsaturated aldehyde or nitrile compound. Since the organo-nickel reactant is free of carbon monoxide, the novel catalysts can be prepared and subsequent oligomerization reactions can be carried out in the absence of any metal carbonyl.

As triesters of phosphorous acid, i.e., the phosphite reactant, there are used the esters of monohydroxy-substituted aliphatic and aromatic hydrocarbons. For example, there can be used the phosphorous acid esters of alkanols having from 1 to 12 carbon atoms, preferably alkanols with branched carbon chains. Especially useful are the esters of aromatic hydroxy compounds, such as phenols and naphthols. The phenols and naphthols may be further substituted by alkyl, aryl, halogen or alkoxy, for example, by one to three alkyl radicals having from 1 to 12 carbon atoms, alkoxy of 1 to 6 carbon atoms, chlorine or phenyl. Phosphites which can be used for the production of complex nickel-(O) compounds having especially active catalytic properties are phenyl esters of phosphorous acid in which substituents are present in ortho-position to the phenolic hydroxy group. Compounds wherein the substituent in ortho-position is relatively voluminous give the greatest catalyst activity. Individual examples of substituents in the phenols and naphthols are methyl, ethyl, propyl, isopropyl, butyl, isobutyl, tertiary butyl, cyclohexyl, phenyl, chloro, bromo, iodo, methoxy, ethoxy.

Examples of individual phosphites which may be used for the production of the new catalytic complex compounds of the invention are:

trimethyl phosphite,
triethyl phosphite,
tri-isopropyl phosphite,
tri-isobutyl phosphite,
tri-(2-ethyl-hexyl) phosphite,
tri-dodecyl phosphite,
triphenyl phosphite,
tri-o-cresyl phosphite,
tri-m-cresyl phosphite,
tri-p-cresyl phosphite,
tri-(2,4-dimethylphenyl) phosphite, tri-(o-isopropylphenyl) phosphite,
tri-(2,6-dimethylphenyl) phosphite,
tri-(p-isobutylphenyl) phosphite,
tri-(p-isooctylphenyl) phosphite,
tri-(2-isopropyl-5-methylphenyl) phosphite (or tri-thymylphosphite),
tri-(o-isobutylphenyl) phosphite,
tri-(2,4-diisopropylphenyl) phosphite,
tri-carvacryl phosphite,
tri-o-diphenyl phosphite,
tri-(o-methoxyphenyl) phosphite,
tri-α-naphthyl phosphite,
tri-β-naphthyl phosphite,
tri-p-chlorophenyl phosphite,
tri-o-chlorophenyl phosphite, and
tri-m-chlorophenyl phosphite.

The reaction between the organic nickel-(O) complex reactant and the phosphite may be illustrated by nickel-bis-acrylonitrile and triphenyl phosphite as follows:

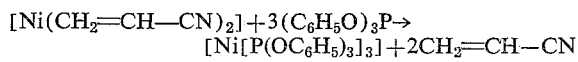

$$[Ni(CH_2=CH-CN)_2] + 3(C_6H_5O)_3P \rightarrow [Ni[P(OC_6H_5)_3]_3] + 2CH_2=CH-CN$$

The reaction of these components to form the new complex compounds is effected by mixing the organic nickel-(O) complex reactant with the phosphite in a mol ratio of about 1:0.5 to 1:5, preferably in a ratio of about 1:3 to 1:5, with substantial exclusion of oxygen at room temperature or at an elevated temperature, e.g. at a temperature which is between about 20° C. and about 120° C. The reaction of the two components is preferably carried out in an organic solvent or diluent which is inert under the reaction conditions. By the phrase "with substantial exclusion of oxygen," we mean that the oxygen content in the gas space above the liquid reaction mixture in the reaction vessel should not exceed about 3% by volume. If larger amounts of oxygen are present, substantial amounts of nickel-(O) complex will be decomposed.

The reaction is usually carried out at normal pressure but it may also be carried out under increased or reduced pressure. Suitable inert solvents or diluents are aliphatic, cycloalphatic and aromatic hydrocarbons, ethers or nitriles of lower alkane carboxylic acids, especially those whose boiling points at the pressure chosen lies in the temperature range of 20° to 120° C. This means that usually solvents boiling between 20° and 120° C. at normal pressure are used, for example, hexane, the various octanes, gasolines fractions of the mentioned boiling range, cyclohexane, benzene or toluene. Of course, solvents of lower boiling point may be used when the reaction is carried out under pressure, or higher boiling point solvents are useful when the reaction is carried out, often with advantage, under reduced pressure. Xylene, tetrahydronaphthalene, decahydronaphthalene and liquid butane or liquid propane may therefore also be used. Of the nitriles, the most suitable are those with two to five carbon atoms, for example acetonitrile and proprionitrile. It is also possible, however, to use as the inert solvent an open chain or cyclic ether, for example diethylether, di-isopropyl ether, di-isobutyl ether, dioxane or tetrahydrofuran.

The ratio of the reactants (nickel complex and phosphite) to the solvent or diluent may vary within wide limits. It is possible to use saturated solutions in which the organic nickel complex is suspended, but very dilute solutions may also be used although it is not convenient to work in a greater dilution than 1 part of nickel complex to 10 parts of solvent. The progress of the reaction can readily be recognized by the change in color of the reaction mixture. The nickel complex solution or suspension is as a rule red in color. It changes its color toward yellow or becomes colorless, and at the same time phosphite-containing nickel complex may be precipitated in solid form. In general, the reaction is ended after 1 to 2 hours. If the complex is precipitated in insoluble form, it is filtered off by suction, washed with an organic solvent, e.g. diethylether, terahydrofuran, dioxane, a saturated aliphatic or cycloaliphatic hydrocarbon such as octane, decane or cyclohexane, and dried. If it remains dissolved in the solution, this solution may be freed from the solvent by distillation and the residue is the desired compound. If it is intended to use the new phosphite-containing nickel complex as a catalyst for the oligomerization of 1,3-dienes, isolation of the reaction product is not necessary since the solution itself can be used as oligomerization reaction medium. Another method of working up the solution comprises adding lower alkanols such as methanol, ethanol or propanol, and precipitating the resulting complexes from solution. All operations are preferably carried out with the substantial exclusion of oxygen.

The phosphite-containing nickel-(O) complex compounds of the invention are yellowish white crystalline compounds. In some cases, it is difficult to purify the compounds obtained by the method described hereinabove. In this case, catalytic activity does not appear to be impaired, and it will be understood that impure products are also within the scope of the present invention.

In other cases, mixtures of compounds are obtained in which it must be assumed, on the basis of analysis, that compounds in which the nickel is enclosed by two ligands and compounds in which the nickel is enclosed by three ligands are present side by side.

The complex compounds of the invention are quite useful as catalysts for the oligomerization of 1,3-butadiene to 1,5-cyclooctadiene or to other oligomers of butadiene. For example, when using bis-(tri-o-tolyl-phosphite)-acrylonitrile-nickel-(O) as a catalyst at a temperature of about 60 to 150° C., the cyclooctadiene in a yield of about 60 to 92% is obtained. Similarly the other new compounds of the invention are catalytically active for this reaction, as more fully set forth in our copending application Ser. No. 121,362.

The invention is further illustrated by the following examples without being restricted thereto.

*Example 1*

For the preparation of the catalyst, 32.4 grams of nickel-bis-acrylonitrile are introduced while excluding air into a 1 l. three-necked flask provided with a dropping funnel, stirred and reflux condenser and suspended in about 500 ml. of absolute ether. 200 grams of triphenyl phosphite is added. The mixture is boiled under reflux for 8 hours with vigorous stirring. The initially intense red colored solution is discolored as the reaction proceeds. The product is filtered off by suction while excluding air and washed with ether. After drying in an oil pump vacuum, 193 grams of a yellowish white finely crystalline substance is obtained which according to analysis has the formula:

$$[Ni[P(OC_6H_5)_3]_3]$$

| Analysis | Percent | | | |
|---|---|---|---|---|
| | Ni | P | C | H |
| Found | 5.2 | 9.3 | 64.4 | 4.85 |
| Calculated for [Ni[P(OC₆H₅)₃]₃] | 5.93 | 9.38 | 65.5 | 4.58 |

116 ml. of liquid butadiene (75.5 grams), 100 ml. of n-hexane (66 grams) and 500 mg. of hydroquinone are placed while excluding air in a 1 l. rotating autoclave of high-grade steel rinsed with nitrogen. 5 grams of the nickel catalyst described above, which is a tris-tri-phenyl-phosphite-nickel, is added thereto. The mixture is heated to 20° C. in the autoclave and kept at this temperature for twelve hours, a pressure of about 20 atmospheres gage being set up. After cooling, 132 ml. of a pale green liquid is obtained as reaction product, which is filtered and then fractionally distilled. 31.3 grams of 1,5-cyclooctadiene is obtained besides 5.6 grams of 4-vinyl-cyclohexene -(1) and 4 grams of a liquid distillation residue. The conversion is accordingly 54%, the selectivity for 1,5-cyclo-octadiene 77% and the yield of cyclo-octadiene 41.5%.

*Example 2*

For the preparation of the catalyst, 11.2 grams of nickel-bis-acrylonitrile is introduced under nitrogen free from oxygen and water into a three-necked flask provided with a stirrer, reflux condenser and nitrogen inlet pipe, and suspended in 250 ml. of ether free from oxygen and water. 72 grams of tri-o-tolyl phosphite is then added. The mixture is boiled under reflux for 2 hours. The color of the originally red solution changes to yellow and the sediment passes into solution. The reaction mixture is then cooled for some hours in an ice-bath and the deposited crystals are filtered off by suction while excluding oxygen, washed with ether and dried in vacuo. 50.2 grams of lemon yellow crystals is obtained which upon heating in the air at 135° C. are decomposed and which in the absence of air show discoloration above 120° C. According to elementary analysis and on the basis of the infrared spectrum, the following composition is assumed for the compound:

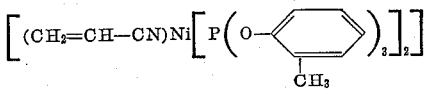

| Analysis | Ni | P | N | C | H |
|---|---|---|---|---|---|
| Found, percent | 7.11 | 7.55 | 1.65 | 64.7 | 5.6 |
| Calculated for above formula, percent | 7.19 | 7.59 | 1.71 | 66.2 | 5.56 |

1.5 grams of the catalyst described above, 0.2 gram of hydroquinone and 40 ml. (31.2 grams) of cyclohexane are charged while excluding air into a 250 ml. pressure vessel. Then 36 grams of liquid butadiene is forced in. The pressure vessel is heated to 100° C. for 12 hours with shaking, a pressure of about 10 atmospheres gage being set up. After cooling, the reaction mixture is distilled, the fraction passing over up to 125° C. at 25 mm. Hg being collected. 2.2 grams of residue (catalyst and resin) and 63 grams of distillate are obtained. 30.6 grams of 1,5-cyclo-octadiene and 2.36 grams of 4-vinyl-cyclohexene-(1) are detected in the distillate by gas chromatography. By distillative separation through an efficient column, about 90 to 95% of the 1,5-cyclo-octadiene detected by gas chromatography can be isolated in the pure state (boiling point of the 1,5-cyclo-octadiene 150° C. to 151° C. at 760 mm. Hg). The conversion therefore lies at 91.5%, the selectivity for 1,5-cyclo-octadiene at 83% and the yield at 76%.

*Example 3*

For the preparation of the catalyst, 51 grams of nickel (O)-bis-acrylonitrile and a solution of 293.5 grams of tri-thymyl phosphite in about 600 ml. of dioxane are introduced into a 1 l. three-necked flask fitted with a stirrer and reflux condenser. While stirring, the temperature is raised to about 70° C., the nickel (O)-bis-acrylonitrile, originally in suspension, passing into solution in the course of 1 to 2 hours. The yellow solution is freed from any solid residues present by filtration and concentrated to about 250 ml. under reduced pressure. After cooling, the crystalline yellow substance is filtered off, washed with methanol and dried in a vacuum exsiccator. 274.5 grams of an air-sensitive substance is obtained which according to analysis has the formula

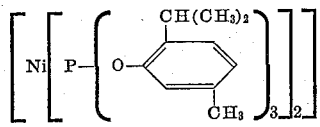

18.3 grams of the yellow air-sensitive nickel (O)-bis-trithymyl phosphite complex in about 400 ml. of cyclohexane and 1 gram of hydroquinone as stabilizer is charged into a 2 l. agitated autoclave after it has been flushed with nitrogen. The autoclave is then heated to 80° C. Gaseous butadiene is led into the autoclave from a steel flask attached thereto through a reducing valve. The butadiene take-up is checked by weighing the steel flask. About 600 grams of butadiene is taken up by the reaction mixture in the course of eight hours. Then the reaction product obtained in the autoclave (952 grams) is distilled at a pressure of 25 mm. Hg and a bottoms temperature up to 100° C. 16.7 grams of resin remains. The distillate obtained is fractionated at normal pressure in a column packed with Raschig rings. The fraction passing over between 80° and 131° C. contains, besides solvent, 7.0 grams of 4-vinyl-cyclohexene-(1), the fraction passing over from 131° to 149° C. (about 28 grams) consists of about equal parts of 4-vinylcyclohexene-(1) (13.77 grams) and 1,5-cyclo-octadiene (14.3 grams). Then 431.3 grams of pure 1,5-cyclo-octadiene passes over between 149° and 151° C. Upon further heating, a distillate is obtained which contains 12.5 grams of 1,5-cyclo-octadiene and 10.8 grams of constituents of higher boiling point. Accordingly, there are obtained in all 458.1 grams of 1,5-cyclo-octadiene, 20.7 grams of 4-vinyl-cyclohexene-(1) and 27.5 grams of resin and high-boiling constituents. Referring to the butadiene reacted, the yield of 1,5-cyclo-octadiene is 90.5% and of 4-vinylcyclohexene-(1) 4.1%. The conversion lies at 84%, the selectivity for 1,5-cyclo-octadiene at 90.5% and the yield at 76%.

*Example 4*

For the preparation of the catalyst, 13.7 grams of nickel (O)-bis-acrylonitrile is caused to react with exclusion of air with a solution of 89.7 grams of tri-o-diphenyl phosphite in about 250 ml. of tetrahydrofuran in a 500-ml. three-necked flask fitted with a stirrer and reflux condenser. After stirring for about two hours at a temperature of 60° C., the nickel compound has practically completely passed into solution with a yellow color. Small amounts of residue are filtered off, the solvent is withdrawn under reduced pressure, the oily residue taken up with ether, filtered again and the ether evaporated. 90.3 grams of a foam which solidifies to form a yellow powder of low bulk density is obtained; according to analysis it has the composition:

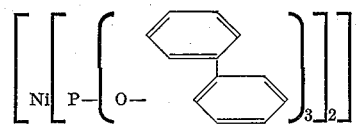

40 ml. (35 grams) of benzene and 1.0 gram of the above-described nickel-(O) complex are charged into a 250-ml. shaking bomb which has been flushed with nitrogen. About 30 grams of butadiene is then forced into the solution and the reaction vessel heated at 80° C. for twelve hours. According to the pressure drop, the reaction is substantially ended after only 30 to 60 minutes. 72.5 ml. of reaction mixture is obtained from the bomb. In the distillation, 57 grams of a colorless liquid passes over and 1.8 grams remains as residue, of which 1.0 gram is catalyst and 0.8 gram resin. The distillate contains, as may be ascertained by gas chromatography, 25.7 grams of 1,5-cyclo-octadiene and 1.4 grams of 4-vinyl-cyclohexene-(1); the total yield, with reference to butadiene reacted, is 92% of 1,5-cyclo-octadiene, 5% of 4-vinyl-cyclohexene-(1) and 3% of resin; the mole ratio of 1,5-cyclo-octadiene to 4-vinyl-cyclohexene-(1) is 18.3:1. The conversion thus is 93%, the selectivity for 1,5-cyclo-octadiene 92% and the yield 86%.

*Example 5*

For the preparation of the catalyst, 2.6 grams of nickel (O)-bis-acrylonitrile and 20.4 grams of tri-(2,4-di-tertiary-butylphenyl)phosphite are reacted in about 150 ml. of dioxane while stirring at 60° to 70° C. The reaction is ended after one to two hours. A dark-colored solution is obtained. It is filtered, the solvent distilled off under reduced pressure and the oily residue obtained is taken up with ether. After filtering off the ether, 17.5 grams of a yellow-brown compound remains which according to analysis has the formula:

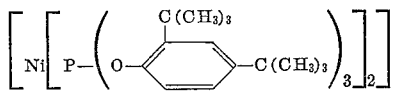

2.5 grams of this complex compound is reacted as described in Example 6 in a shaking autoclave with about 30 grams of butadiene and 40 ml. of cyclohexane at 100° C. 59.8 grams of a dark colored reaction mixture is obtained. By distillation of this mixture, 56.6 grams of a colorless distillate is obtained which, according to gas chromatography, contains 25 grams of 1,5-cyclo-octadiene and 1.3 grams of 4-vinyl-cyclohexene-(1). The residue (3 grams) contains 0.5 gram of resin and high boiling products in addition to the catalyst used. The conversion is 89.5%, the selectivity for 1,5-cyclo-octadiene 93% and the yield 83.5%.

Example 6

8.2 grams of nickel (O)-bis-acrylonitrile in 150 ml. of dioxane is stirred with 52.5 grams of tri-m-tolyl phosphite at 60° C. for one hour. The reaction solution is filtered and the solvent substantially distilled off. By adding methanol, a white powder is precipitated which is filtered off and washed with methanol. After drying, there is obtained 31 grams of a white compound of the composition

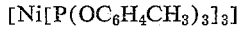
[Ni[P(OC$_6$H$_4$CH$_3$)$_3$]$_3$]

| Analysis | C | N | Ni | P | N |
|---|---|---|---|---|---|
| Found, percent | 67.9 | 5.6 | 4.0 | 7.2 | 0.5 |
| Calculated, percent | 67.81 | 5.69 | 5.2 | 8.33 | |

1.5 grams of tris-(tri-m-tolyl-phosphite)-nickel, 0.2 gram of hydroquinone and 40 ml. of cyclohexane are charged into a 250-ml. shaking autoclave. Then 27 grams of liquid butadiene is forced in. The autoclave is heated for 12 hours at 120° C. while shaking. As the reaction mixture, 56 grams of a dark brown solution is obtained which is distilled at 20 mm. Hg and a bottoms temperature up to 100° C. 4.0 grams remains in the flask as a residue while 48.6 grams of a colorless liquid passes over as a distillate. According to gas chromatographic analysis, this contains 21.2% of 1,5-cyclo-octadiene and 9.2% of 4-vinyl-cyclohexene-(1). Accordingly, 10.8 grams of 1,5-cyclo-octadiene and 4.7 grams of 4-vinyl-cyclohexene-(1) have been formed. The selectivity is 60% for 1,5-cyclo-octadiene, the yield of 1,5-cyclo-octadiene is 40.0%.

Example 7

9.0 grams of nickel (O)-bis-acrylonitrile is mixed with a solution of 50.6 grams of tri-(α-naphthyl)-phosphite in 200 ml. of dioxane while excluding air and then stirred at 60° to 70° C. for 2½ hours, the nickel (O)-acrylonitrile slowly passing into solution. The solution is filtered under nitrogen as protective gas. The solvent is distilled off from the filtrate under reduced pressure and the oily residue is dissolved in 150 ml. of ether, the solution filtered and the solvent again distilled off. Taking up in ether, filtration and distilling off the ether are repeated twice. 33 grams of a brownish-yellow air-sensitive substance is then obtained as residue; acrylonitrile is not detectable therein and according to analysis it has a mole ratio of nickel to tri-(α-naphthyl)-phosphite of 1:2.4.

2.5 grams of the reaction product of nickel (O)-bis-acrylonitrile and tri-(α-naphthyl)-phosphite, dissolved in 30 ml. of hexane, and 0.1 gram of hydroquinone are charged into a 250-ml. shaking autoclave filled with nitrogen. Then 28 grams of butadiene is forced in and the reaction vessel heated to 100° C., the pressure rising to about 6 atmospheres gage. After heating for twelve hours, the reaction mixture is allowed to cool and distilled at 25 mm. Hg, the still being heated to 100° C. 4.6 grams of residue is obtained which, besides the catalyst and stabilizer, contains 2.0 grams of high boiling hydrocarbons. The distillate (46.5 grams), as shown by gas chromatographic analysis, contains, besides the solvent, 17.8 grams of 1,5-cyclooctadiene and 2.85 grams of 4-vinyl-cyclohexene-(1). The conversion is accordingly 81%, the selectivity in respect of 1,5-cyclo-octadiene 78.6% and the yield 63.6%.

Example 8

12.3 grams of nickel (O)-bis-acrylonitrile and 59 grams of tri-(3,5-dimethylphenyl)-phosphite (mole ratio 1:2) are reacted while excluding air at a temperature of 60° to 70° C. with continuous stirring, the nickel (O)-bis-acrylonitrile passing completely into solution. The yellow-brown solution is filtered and the solvent completely distilled off from the filtrate. The yellow residue is recrystallized from petroleum ether, 31.5 grams of a yellow crystalline compound being obtained which according to analysis is a bis-(tri-3,5-dimethyl (phenyl)-phosphite)-nickel (O)-monoacrylonitrile

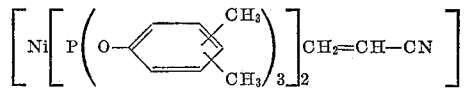

By working up the mother liquor, the yield of the complex may be increased.

30 grams of butadiene is forced into a solution of 1.6 grams of the above-described complex compound in 40 ml. of hexane in a 250 ml. shaking bomb and reacted at 100° C. After twelve hours, the reaction mixture is distilled at 25 mm. Hg, the bottoms being heated to 100° C. 4 grams of residue is obtained which besides the catalyst contains 2.4 grams of high boiling hydrocarbons, and 53.2 grams of distillate which according to gas chromatographic analysis contains 18.5 grams of 1,5-cyclo-octadiene and 3.4 grams of 4-vinyl-cyclohexene-(1). The conversion is 81%, the selectivity 76% and the yield of 1,5-cyclo-octadiene 62%.

Example 9

In a manner analogous to that described in Example 8, 11.9 grams of nickel (O)-bis-acrylonitrile is reacted with 68 grams of tri-(p-tertiary-butylphenyl)-phosphite in 150 ml. of tetrahydrofuran at 60° to 70° C. for about 2 hours while stirring. The yellow solution is filtered, the solvent distilled off at 25 mm. Hg, the residue taken up in 150 ml. of ether, this solution filtered and the solvent withdrawn, 72.9 grams of nickel (O)-bis-(p-tertiary-butylphenyl)-phosphite is obtained.

30 grams of butadiene is forced into a solution of 2.5 grams of this complex compound in 40 ml. of hexane in a shaking autoclave filled with nitrogen after the addition of 0.1 gram of hydroquinone. The mixture is heated for twelve hours at 120° C. and the reaction mixture then worked up as described in Example 8. Besides the catalyst, 1.9 grams of high boiling hydrocarbons, 22 grams of 1,5-cyclo-octadiene and 4.4 grams of 4-vinyl-cyclohexene-(1) are obtained. The conversion is accordingly 94%, the selectivity for 1,5-cyclo-octadiene 74% and the yield 70%.

Similar results are obtained when a catalyst is used which has been prepared by reaction of nickel (O)-bis-acrylonitrile with tri-(p-iso-octylphenyl)-phosphite.

We claim:
1. A nickel complex compound of the formula

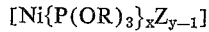
[Ni{P(OR)$_3$}$_x$Z$_{y-1}$]

wherein R represents a member selected from the group consisting of alkyl, aryl, alkylaryl, alkoxyaryl and halogenaryl, Z represents a member selected from the group consisting of α,β-ethylenically unsaturated aldehydes and nitriles, x stands for an integer of from 2 to 3, y stands for an integer of from 1 to 2, the sum of x and y−1 being an integer of from 2 to 3.

2. Tris-(tri-phenyl-phosphite)-nickel.
3. Bis-(tri-o-cresyl-phosphite)-acrylonitrile-nickel.
4. Bis-(tri-thymyl-phosphite)-nickel.
5. Bis-(tri-o-diphenyl-phosphite)-nickel.
6. Bis-(tri-2,4-di-tertiary-butylphenyl-phosphite)-nickel
7. Bis-(tri-4-tertiary-butylphenyl-phosphite)-nickel.
8. Bis-(tri-4-iso-octylphenyl-phosphite)-nickel.
9. A process for the production of a complex compound of the formula:

$$[Ni\{P(OR)_3\}_x Z_{y-1}]$$

wherein R represents a member selected from the group consisting of alkyl, aryl, alkylaryl, alkoxyaryl and halogenaryl, Z represents a member selected from the group consisting of $\alpha,\beta$-ethylenically unsaturated aldehydes and nitriles, $x$ stands for an integer of from 2 to 3, $y$ stands for an integer of from 1 to 2, the sum of $x$ and $y-1$ being an integer of from 2 to 3, which process comprises, reacting (A) a compound consisting of nickel-(O) in complex combination with a compound selected from the group consisting of $\alpha,\beta$-ethylenically unsaturated aldehydes and nitriles with (B) a phosphite of the formula $P(OR)_3$, in which R has the same meaning as above, at a temperature of about 20° C. to 120° C. with substantial exclusion of oxygen.

10. A process as claimed in claim 9 wherein said reaction of the components (A) and (B) is carried out in an inert organic diluent.

11. A process as claimed in claim 9 wherein the molar ratio of (A):(B) is about 1:0.5 to 1:5.

References Cited

UNITED STATES PATENTS 3,131,155  4/1964  Luttinger _____ 260—439

OTHER REFERENCES

Malatesta et al.: J. Chem. Soc. (1957), pp. 1186–8.
Malatesta et al.: J. Chem. Soc. (1958), pp. 2323–8.
Meriwether et al.: J. Am. Chem. Soc., 81 (1959), pp. 4200–4.
Schrauzer, G. N.: J. Am. Chem. Soc., 81, p. 5310 (1959).
Schrauzer: J. Am. Chem. Soc., 81 (1959), p. 5312.

TOBIAS E. LEVOW, *Primary Examiner.*

T. L. IAPALUCCI, A. P. DEMERS, *Assistant Examiners.*